Patented June 4, 1940

2,203,324

UNITED STATES PATENT OFFICE 2,203,324

PRODUCTION OF DEXTROSE

Charles J. Copland, North Kansas City, Mo., assignor, by mesne assignments, to Corn Products Refining Company, New York, N. Y., a corporation of New Jersey No Drawing. Application May 19, 1938, Serial No. 208,823

8 Claims. (Cl. 127—38)

This invention relates to the production of crystalline dextrose from starch converted dextrose solutions; and the primary object of the invention is to increase the dextrose yield, that is, the amount of crystalline dextrose obtainable from a given quantity of solution.

The invention may be regarded as an improvement upon the processes described and claimed in United States patents to William B. Newkirk, No. 1,471,347, October 23, 1923, and No. 1,521,830, January 6, 1925. According to the practice under the patents, the converted liquor, after suitable refining operations and concentration to proper density, is introduced into a crystallizer having a slow moving agitator and supersaturation brought about and maintained by cooling. After crystallization, the massecuite is purged of its mother liquor (first greens) and washed with water in centrifugal machines. The first greens, after refining and concentration, are subjected to another crystallizing operation, in a crystallizer of the type mentioned, and the mother liquor (hydrol) extracted from the crystals by centrifuging. The second sugar thus produced may be marketed as such, either with or without washing in the centrifugal machine; or it may be melted with or without washing, the melt mixed with fresh converter liquor and the mixture used for a subsequent first crystallizing operation. Under present practice the second sugar will have a somewhat lower purity than the first sugar, the purity of which may be between 99.5% and 100%; and the second crystallization will ordinarily be prolonged until the hydrol will be incapable of further crystallization. That is, if the massecuite is given the usual slow agitation in a standard type of crystallizing vessel, substantially no more dextrose will come out of the solution at least within a reasonable length of time. The mother liquor or hydrol is a spent liquor so far as any practical continuation of crystallization is concerned. Under these circumstances, the purity of the hydrol (reducing sugars calculated as dextrose) will be in the neighborhood of 67% to 69% and its dextrose content about 50%, both on dry substance basis.

It has been proposed to re-convert the hydrol, in order to obtain therefrom additional crystalline dextrose, by acidifying and heating it in an autoclave at the steam pressures which are customary for the conversion of the starch to dextrose. Processes of this character are disclosed in the patents of Ebert, Newkirk and Moskowitz, No. 1,673,187, June 12, 1928, and No. 1,704,037, March 5, 1929; and these processes have been successively operated to effect a yield of crystalline dextrose from hydrol. However, the processes have certain disadvantages, for example, the expense involved in the re-conversion and the production of color in the massecuite which is difficult to remove.

Where a dextrose containing solution, such as hydrol, is re-converted according to the method disclosed, for example, in the patent to Ebert et al, No. 1,704,037, referred to above, the action of the acid at high temperatures contemplated is to change the non-crystallizable reducing sugars in the solution (formed probably by condensation of dextrose, a typical one being the di-saccharide gentiobiose) into the crystallizable mono-saccharide, dextrose. The reaction involves also the conversion of non-reducing sugars, of higher molecular weight than gentiobiose into gentiobiose or other reducing sugars.

The present invention is based upon the discovery that the conversion of non-crystallizable sugar to dextrose can be brought about by the use of a suitable hydrolyzing or converting acid at ordinary room or crystallizing temperatures, that is, without the high temperatures and pressures used in the patented processes of hydrol re-conversion referred to above.

In carrying out the new process as applied to the treatment of hydrol, the hydrol, after concentration, is introduced into a standard type crystallizer above described, and is there mixed with massecuite from a previous crystallizing operation, preferably with massecuite or "foots" from a second crystallizing operation; the mixing being effected by means of the agitator which is set in motion in the usual manner. Because of the concentration of the hydrol and change in proportions as between solid and liquid phases, the liquid phase being proportionately larger in the mixture than in the massecuite from which the hydrol was purged, some crystallization will take place. When this has substantially ceased (or, if desired at any earlier stage of the process) hydrochloric acid, or other strong acid commonly used for the conversion of starch to dextrose, referred to herein as "converting acid" is introduced into the massecuite and the slow motion agitation continued. Apparently the acid, which might be added at an earlier stage, is more effective for the purpose intended if added after some crystallization has taken place. The result is that the dextrose content of the solution is increased and the solution yields additional crystallized dextrose.

The addition of acid may be repeated from time to time until no further yield of crystalline dextrose results; or until such time as the operation ceases to be profitable, having in view the amount of additional dextrose capable of being produced in this manner. Apparently the acid acts, without heat, which has not been heretofore suspected, upon the gentiobiose or other non-crystallizable polysaccharides to change them to crystallizable dextrose, whereby the solution becomes again supersaturated in respect to dextrose. The dextrose crystallizes as the hydrate under the conditions described.

The invention, however, is not limited to the treatment of low content dextrose solutions, nor to the addition of the acid to a massecuite after crystallization has ceased, but may be employed to increase the dextrose content of any dextrose solution containing non-crystallizable sugars capable of being re-converted into dextrose, through increase of the acidity of the solution treated and may be introduced into the solution at any suitable stage of the process. For example, acid may be added to the concentrated converter liquor going to the first crystallizers or to the concentrated first greens sent to the second crystallizers.

The following is a specific example of the application of the invention to the treatment of hydrol. It will be understood that this example is purely informative and typical. It is not the purpose to limit the scope of the invention to the particulars given in this example, the intention being to cover all equivalents as well as all modifications within the scope of the appended claims.

*Example.*—75,000 pounds of hydrol (mother liquor from a second crystallization) having a purity (reducing sugar calculated as dextrose) of 67%–69% was introduced, at a density of 41.5° Baumé, into a standard crystallizer on 30,000 pounds of massecuite (foots) produced in a second crystallizing operation. The mixture, hydrol and foots, was cooled to 62°–64° F. and this temperature maintained with the agitator in slow motion, until crystallization substantially ceased, which was after a yield had been reached of about 31% crystalline dextrose hydrate, based on dry substance in the massecuite. At this point 100 pounds of 18° Baumé hydrochloric acid was added to the massecuite and the yield increased to approximately 35%. Several more additions of acid were made from time to time until the yield reached 37%, after which no further crystallization took place. The yield figures, it will be understood, were arrived at by taking samples from the massecuite from time to time and determining the proportion between crystalline dextrose hydrate and total dry substance. When crystallization ceased, the massecuite was centrifuged and the dextrose, without washing was found to have a purity of 89.0%. The yield, on the 100% purity basis, was 20.6% of the dry substance in the hydrol treated. In this example the crystallizing period was 45 days. The samples of the fillmass, solution in solid phase, taken from time to time, indicated a progressive decrease in gentiobiose and a progressive increase in dextrose.

I claim:

1. In the production of dextrose, the treatment of a starch converted dextrose solution containing non-crystallizable sugar with a converting acid, at a pressure not substantially above atmospheric pressure to change said non-crystallizable sugar into crystallizable dextrose.

2. In the production of dextrose from a starch converted dextrose solution containing non-crystallizable sugar, the treatment of a substantially spent mother liquor with an acid, at a pressure not substantially above atmospheric pressure, to change non-crystallizable sugar into crystallizable dextrose.

3. Improvement in the process of crystallizing dextrose from a starch converted dextrose solution containing non-crystallizable sugar which comprises: adding a converting acid to the massecuite during the crystallizing operation to increase the amount of crystallizable dextrose in the solution.

4. Improvement in the process of crystallizing dextrose from a starch converted dextrose solution containing non-crystallizable sugar which comprises: adding a converting acid to the massecuite, after crystallization has substantially ceased, for the purpose of converting non-crystallizable sugar into crystallizable dextrose and thereby permitting a further yield of crystalline dextrose.

5. Treatment of substantially spent mother liquor containing non-crystallizable sugar derived from the process of making crystalline dextrose which comprises: mixing with the mother liquor massecuite from a previous crystallizing operation, adding a converting acid and maintaining the material in slow motion at a pressure not substantially above atmospheric pressure to bring about further crystallization of dextrose.

6. Treatment of substantially spent mother liquor containing non-crystallizable sugar derived from a process of making crystalline dextrose which comprises: mixing the mother liquor with massecuite from a previous crystallizing operation; maintaining the material in slow motion at a pressure not substantially above atmospheric pressure; and adding, after crystallization has substantially ceased, a converting acid to change the non-crystallizable sugar into crystallizable dextrose; and continuing the slow motion agitation.

7. In the production of crystalline dextrose from starch converted dextrose solutions, containing non-crystallizable sugar in which the mother liquor from the first crystallization is subjected to a second crystallizing operation, the process of treating mother liquor from the second crystallization which comprises: mixing with said mother liquor second sugar massecuite; maintaining the mixture in slow motion at a pressure not substantially above atmospheric pressure; and, after crystallization has substantially ceased, adding a converting acid and continuing the slow motion agitation.

8. Process of obtaining crystalline dextrose from a starch converted dextrose solution containing non-crystallizable sugar which comprises: supersaturating the solution to bring about crystallization; removing the mother liquor from the crystal mass; subjecting the mother liquor to another crystallizing operation; extracting the hydrol from the massecuite; concentrating the hydrol and mixing therewith massecuite from a second crystallization; and subjecting the same to another crystallizing operation; and when crystallization has substantially ceased adding to the massecuite a converting acid and continuing the crystallizing operation.

CHARLES J. COPLAND.